(12) United States Patent
Choate et al.

(10) Patent No.: US 7,873,874 B2
(45) Date of Patent: *Jan. 18, 2011

(54) SYSTEM AND METHOD FOR CONTROLLING SYNCHRONOUS FUNCTIONAL MICROPROCESSOR REDUNDANCY DURING TEST AND ANALYSIS

(75) Inventors: Michael L. Choate, Round Rock, TX (US); Arthur M Ryan, Round Rock, TX (US); Kevin E. Ayers, Round Rock, TX (US); Douglas L. Terrell, Pflugerville, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 464 days.

This patent is subject to a terminal disclaimer.

(21) Appl. No.: 11/836,200

(22) Filed: Aug. 9, 2007

(65) Prior Publication Data

US 2009/0044057 A1 Feb. 12, 2009

(51) Int. Cl.
  *G06F 11/00* (2006.01)
(52) U.S. Cl. ....................................................... 714/45
(58) Field of Classification Search ............. 714/11–13, 714/45
See application file for complete search history.

(56) References Cited

U.S. PATENT DOCUMENTS

| 6,058,491 | A | 5/2000 | Bossen |
| 6,134,679 | A | 10/2000 | Liddell |
| 6,173,416 | B1 | 1/2001 | Liddell |
| 6,223,304 | B1 | 4/2001 | Kling |
| 6,629,268 | B1 | 9/2003 | Arimilli |
| 6,938,183 | B2 | 8/2005 | Bickel |
| 2007/0022342 | A1* | 1/2007 | Picano et al. ............... 714/727 |
| 2008/0172586 | A1* | 7/2008 | Whetsel ...................... 714/726 |

* cited by examiner

*Primary Examiner*—Bryce P Bonzo
(74) *Attorney, Agent, or Firm*—Meyertons, Hood, Kivlin, Kowert & Goetzel, P.C.; Erik A. Heter

(57) ABSTRACT

A system for testing a processor. The system includes a gold processor and a test access port (TAP). A processor that is a under test (DUT) is coupled to both the gold processor and the TAP. Test signals are simultaneously provided to both the gold processor and the DUT such that the gold processor and the DUT operate in synchronous functional lockstep. The TAP may also input test signals into the gold processor and DUT simultaneously and access data from each of these processors through separate test data out (TDO) connections. Test output data accessed from the gold processor may be compared to test output data accessed from the DUT to determine if any differences are present. The comparison data generated may then be used for analysis purposes.

19 Claims, 8 Drawing Sheets

SYSTEM AND METHOD FOR CONTROLLING SYNCHRONOUS FUNCTIONAL MICROPROCESSOR REDUNDANCY DURING TEST AND ANALYSIS

BACKGROUND OF THE INVENTION

1. Field of the Invention

This invention relates to microprocessors, and more particularly, testing microprocessors and analysis of results obtained from said testing.

2. Description of the Related Art

During design and manufacturing of microprocessors, testing and debug are required to both verify the design, and later, to ensure the quality of the finished product. A wide variety of systems and methods for testing and debugging microprocessors are available. In some systems, microprocessors may be tested by operating them synchronously with another processor. In such systems, the other microprocessor is a reference microprocessor that is commonly referred to as a "gold" microprocessor. Testing in such a system includes comparisons of microprocessor circuit outputs that represent the critical internal state of the gold microprocessor and the device under test (DUT).

During this type of testing, it is critical that synchronization between the gold microprocessor and the DUT is maintained. If synchronization is not maintained, any comparisons between the internal states will be invalid. However, maintaining synchronization between the processors is often times very difficult, particularly in a testing environment. Furthermore, it is also critical that the internal state of the microprocessors involve be observable without disturbance. Should the state of either microprocessor (the gold or the DUT) be disturbed during observation, comparisons of data extracted from the two may be invalid.

Another problem is efficiently comparing the data to quickly determine what differences (if any) are present between the gold processor and the DUT.

SUMMARY OF THE INVENTION

A system for testing a processor is disclosed. In one embodiment the system includes a gold processor and a test access port (TAP). A processor that is a device under test (DUT) is coupled to both the gold processor and the TAP. The TAP is coupled to simultaneously provide test signals to both the gold processor and the DUT such that, during testing, the gold processor and the DUT operate in synchronous functional lockstep with respect to each other. The TAP includes a first test data out (TDO) connection coupled to access test output data from the gold processor, and a second, separate TDO connection coupled to access test output data from the DUT. The system also includes an interface control unit coupled to the TAP. The interface control unit is configured to cause the TAP, during testing, to drive signals to both the gold processor and the DUT. The interface control unit is further configured to access test output data from the gold processor and the DUT independently of one another.

A method for controlling the test access port (TAP) of a set of functionally redundant processors is also disclosed. In one embodiment, the method comprises driving test signals from the TAP to a gold processor and a DUT, wherein the TAP is coupled to simultaneously provide a plurality test signals to both the gold processor and the DUT such that, during testing, the gold processor and the DUT operate in synchronous functional lockstep with respect to each other. The TAP is controlled by an interface control unit configured to cause the TAP to perform said driving. The method further comprises the TAP receiving test output data from the gold processor through a first TDO connection, and receiving test output data from the DUT through a second TDO connection. Test data received from the gold processor and the DUT are displayed on a display unit, results of the testing are determined.

BRIEF DESCRIPTION OF THE DRAWINGS

Other aspects of the invention will become apparent upon reading the following detailed description and upon reference to the accompanying drawings in which.

Figure 1A:
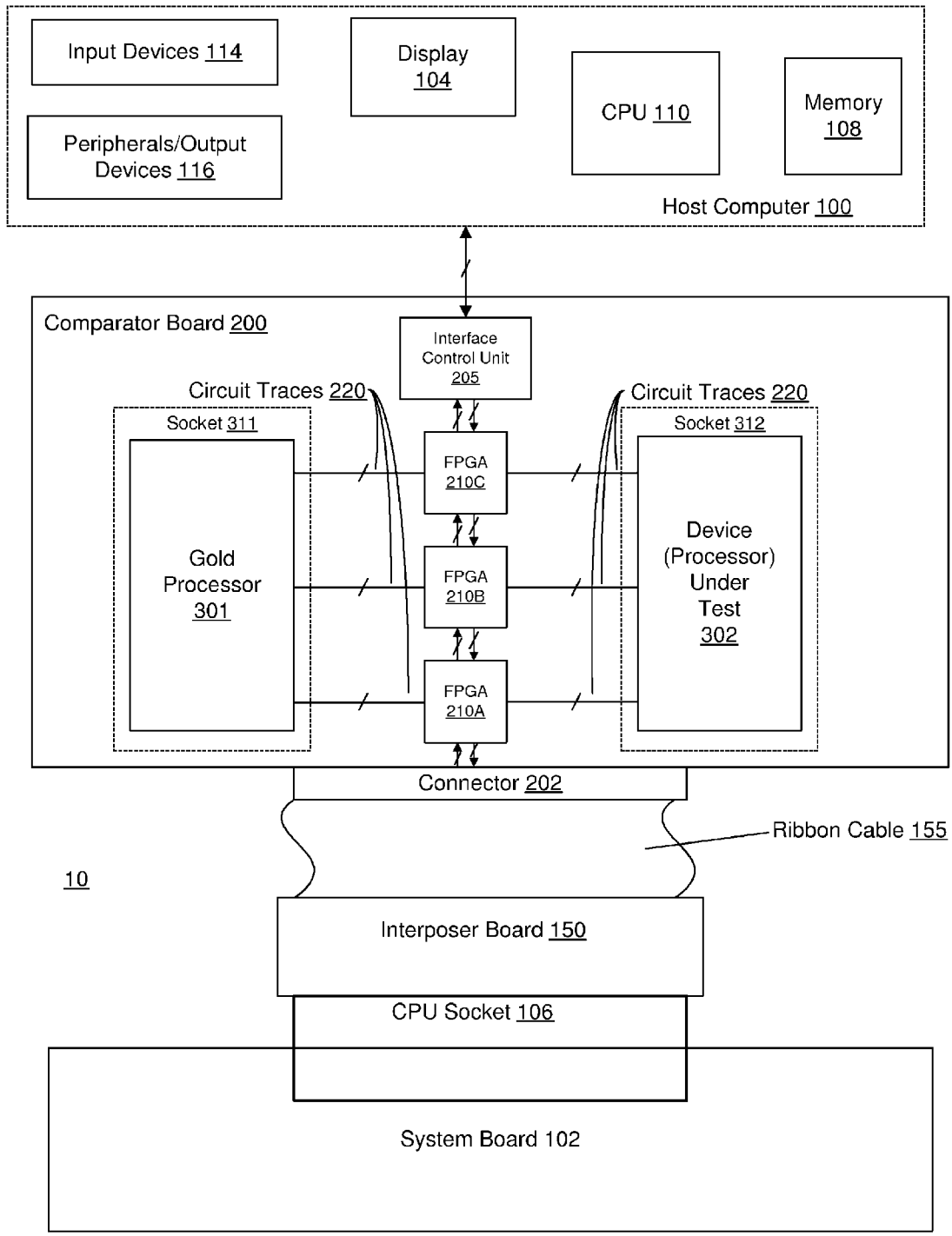
FIG. 1A is a drawing of one embodiment of a test system.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Turning now to FIG. 1A, a drawing of one embodiment of a test system is shown. Other embodiments are possible and contemplated, as will be discussed below. In the embodiment shown, test system 10 is configured to perform testing on processor that is a device under test (DUT) 302. This testing may be performed in a manufacturing environment to verify the functionality of a processor prior to shipping, or may be performed in a development environment as well. Generally speaking, testing is conducted by operating DUT 302 in synchronous functional lockstep with gold processor 301, i.e. the processors are operated as functionally redundant processors. The gold processor 301 and DUT 302 are the same type of processor and have the same revision level. Gold processor 301 is a processor that has been verified to function correctly in accordance with the specifications of the type and revision level of both itself and DUT 302. One goal of the test is that the internal state of both gold processor 301 and DUT 302 be the same at the same time. Any differences between the internal states are detected during testing, and test data output by both processors can be analyzed to determine the extent of the internal state differences. Analysis of internal state differences may be used to pinpoint the circuitry internal to DUT 302 that is operating beyond specifications.

In this particular embodiment, gold processor 301 and DUT 302 are mounted on comparator board 200. Comparator board 200 is a printed circuit board that is configured to accommodate gold processor 301 and DUT 302. Gold processor 301 is coupled to comparator board 200 by socket 311 while DUT 302 is coupled to comparator board 200 by socket 312. Sockets 311 and 312 allow substitution of different pairs of gold and DUT processors for testing different models and/or revisions. Comparator board 200 is coupled to a system board 102 via a connector 202 (mounted on comparator board 200), an optional ribbon cable 155, an optional interposer board 150, and to system board 102 by CPU socket 106 which is mounted thereon. Optional Interposer board 150 is configured to plug into CPU socket 106 to operate the same as a DUT CPU would.

System board 102 is a computer system motherboard, with its central processing unit (CPU) functions provided via operation of the processors on comparator board 200. In the configuration shown, system board 102 operates comparator board 200 as its CPU when gold processor 301 and DUT 302 are operating in lockstep. Since the circuit traces 220 coupled to each of gold processor 301 and DUT 302 are of the same length and thus the timing of signal inputs to and outputs from these processors is also the same, system board 102 will operate as if a processor itself is plugged into CPU socket 106. System board 102 may also be any system for testing CPUs in a manufacturing or development environment.

Comparator board 200 also includes a plurality of field programmable gate arrays (FPGA's) 210A-210C that are coupled to both gold processor 301 and DUT 302. In an alternate embodiment, FPGA's 210 may be replaced by application specific integrated circuits (ASICs). Each FPGA 210 may implement functionality that supports operation of gold processor 301 and DUT 302 in synchronous functional lockstep, and thus the testing of DUT 302. In other embodiments, a greater or lesser number of FPGA's 210 may be present than shown here.

In the embodiment shown, at least one of FPGA's 210A-210C include a test access port (TAP). The TAP may conform to the IEEE 1149.1 specification, although other types of TAPs are also possible and contemplated. The TAP may be used to input data and commands into gold processor 301 and DUT 302 during operation of test system 10, and further, to extract information therefrom. An embodiment of the TAP(s) implemented in test system 10 will be discussed in further detail below.

One or more of FPGA's 210A-210C in the embodiment shown may include comparator circuitry. Comparator circuitry in a given FPGA is coupled to both gold processor 301 and DUT 302, and more particularly, to output pins and input/output (I/O) pins. During testing, the state of these pins is monitored by the comparator circuitry, which performs comparisons of the state of each coupled pin of gold processor 301 to a corresponding pin of DUT 302. The comparisons are performed to ensure that each coupled pin of gold processor 301 is at the same logic level as its counterpart on DUT 302. When gold processor 301 and DUT 302 are operating in synchronous functional lockstep, the state of these pins should be the same for every clock cycle. Thus, continued operation of both gold processor 301 and DUT 302 without any indication of a difference by the comparison circuitry is an effective indication that synchronous functional lockstep has been achieved and is being maintained. If the comparison circuitry detects a difference, an indication is provided to interface control unit 205, as will be discussed below.

Figure 1B:
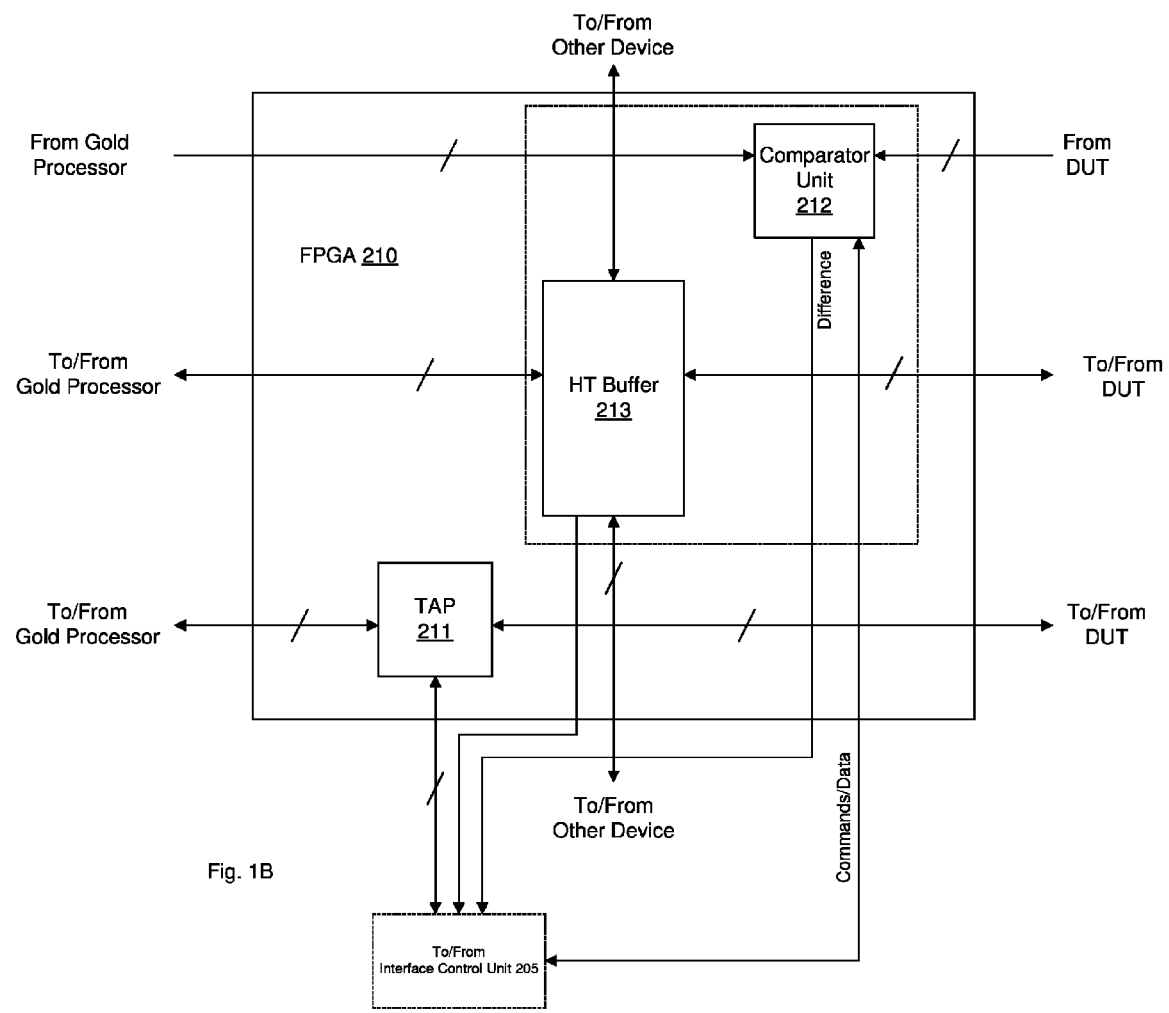
FIG. 1B is a drawing of one embodiment of a field programmable gate array (FPGA) implemented in the test system shown in FIG. 1A.

FIG. 1B is an illustrative embodiment of an FPGA such as those discussed above. In the embodiment shown, FPGA 210 includes a TAP 211, a comparison unit 212, and a HyperTransport™ (HT) buffer 213. As noted above, TAP 211 may be an IEEE 1149.1 or other type of test access port, and may be used to input commands and data into each of gold processor 301 and DUT 302. TAP 211 may also be used to access data within gold processor 301 and DUT 302 through connections to each. Commands to TAP 211 are conveyed from a source external to FPGA 210 through Interface Control Unit 205 to TAP 211. Similarly, data received by TAP 211 may be conveyed to a destination external to FPGA 210 through Interface Control Unit 205.

FPGA 210 also includes comparator unit 212, which is coupled to both gold processor 301 and DUT 302. Comparator unit 212 is configured to compare signals received from gold processor 301 to those received from DUT 302. If any difference is detected, an indication is conveyed to interface control unit 205. In this particular embodiment, a signal is conveyed from comparator unit 212 to interface control unit 205 on the signal path labeled 'difference', after which the interface control unit 205 conveys the indication to Host computer 100 shown in FIG. 1A.

HT buffer 213 is also coupled directly to gold processor 301 and DUT 302. In accordance with the HyperTransport™ protocol, upstream data and/or commands may be conveyed through HT buffer 213 to gold processor 301 and DUT 302. Similarly, downstream data and/or commands may be conveyed from gold processor 301 and/or DUT 302 through HT buffer 213.

It should be noted that in some embodiments, not every instance of FPGA 210 includes a TAP 211, nor does every instance necessarily includes a comparator unit 212. Furthermore, as previously discussed, embodiments of test system 10 (and thus, comparator board 200) that rely on bus topologies other than the HyperTransport™ bus implemented in this particular embodiment are also possible and contemplated.

Returning to FIG. 1A, each of FPGA's 210A-210C is coupled to both gold processor 301 and DUT 302 by a plurality of circuit traces 220. Signals (including test signals) are conveyed from the various units in each of FPGA's 210A-210C to both gold processor 301 and DUT 302 over the circuit traces 220. Since test system 10 is configured to test DUT 302 by operating it in synchronous functional lockstep (i.e. both processors in the same state at the same time), it is critical that the length of circuit traces 220 be carefully controlled. More particularly, the length of the traces is such that test signals are transmitted by an FPGA 210 are received simultaneously by both gold processor 301 and DUT 302. As used herein, the term "simultaneously" is construed to mean that corresponding signals are received by both gold processor 301 and DUT 302 during the same clock cycle, and more particularly, on the same clock edge. Thus, a signal path (implemented in this embodiment as one of circuit traces 220) for a signal from a given one of FPGA's 210A-210C to gold processor 301 and a corresponding signal path for the same signal to DUT 302 are substantially the same length. In this particular embodiment, a variance of no more than $\frac{1}{1000}$ of an inch is permitted between a signal path to gold processor 301 and a corresponding path to DUT 302 for the same signal. This ensures that the signals transmitted are effectively received simultaneously on the inputs of gold processor 301 and DUT 302. This in turn may facilitate synchronous functional lockstep between the two processors assuming they are operating correctly.

Circuit traces for signals that are monitored by the comparator circuitry in one or more of FPGA's 210A-210C are also be subject to these design rules in order to ensure timely and accurate comparisons of the states of the processors.

It is also noted that in this particular embodiment, each of FPGA's 201 may implement a HyperTransport™ buffer.

Accordingly, communications between the gold processor 301, DUT 302, and other portions of test system 10 may be performed in accordance with the HyperTransport™ communications protocol. However, other embodiments that use other bus topologies and communications protocol are also possible and contemplated, and thus the use of HyperTransport™ tunnels discussed herein is not limiting.

Comparator board 200 also includes an interface control unit 205. Interface control unit 205 is configured to control and coordinate FPGA, TAP and comparator operations during test. Among the functions provided by interface control unit 205 is the control of the TAP implemented in one of FPGA's 210A-210C (or multiple TAPs if the system is so configured). For example, interface control unit 205 may direct a TAP to input various commands to gold processor 301 and DUT 302 during testing. If differences are detected by one of the comparators implemented in the FPGA's 210A-210C, a signal indicating the detection of a difference is provided by that comparator to interface control unit 205. In turn, interface control unit 205 may respond by halting the test and causing gold processor 301 and DUT 302 to dump internal data indicative of their respective states at the time the difference is detected.

Control of interface control unit 205 is provided by a host computer 100 coupled thereto. The interface between host computer 100 and interface control unit 205 may be USB 2.0 or other standard interface bus. Host computer 100 includes a CPU 110 that is configured to execute a software application (to be discussed in further detail below) that provides control of the testing process. This includes the generation of signals that are provided to interface control unit 205, which in turn controls various functional units implemented on the comparator board, such as the TAP. Test output data received from gold processor 301 and DUT 302 may be stored in memory 108, allowing the software application to access the data to perform comparisons and such. The software application may include a number of different sub-applications, and may have a high degree of user configurability. This may allow a user to specify what types of tests are run, commands and data that are input into gold processor 301 and/or DUT 302, breakpoints for halting testing, comparisons to be made, and type, amount, and format of test result data that are displayed on display unit 104. Test output data and comparison results may be displayed on display unit 104, thereby providing a user of test system 10 to observe and analyze the data. Host computer 100 also includes one or more input devices 114, including such devices as a keyboard, mouse, and so forth. Host computer 100 may also include one or more peripherals/output devices 116, such as a printer for printing a hardcopy of the test result data and/or comparison data.

Figure 2:
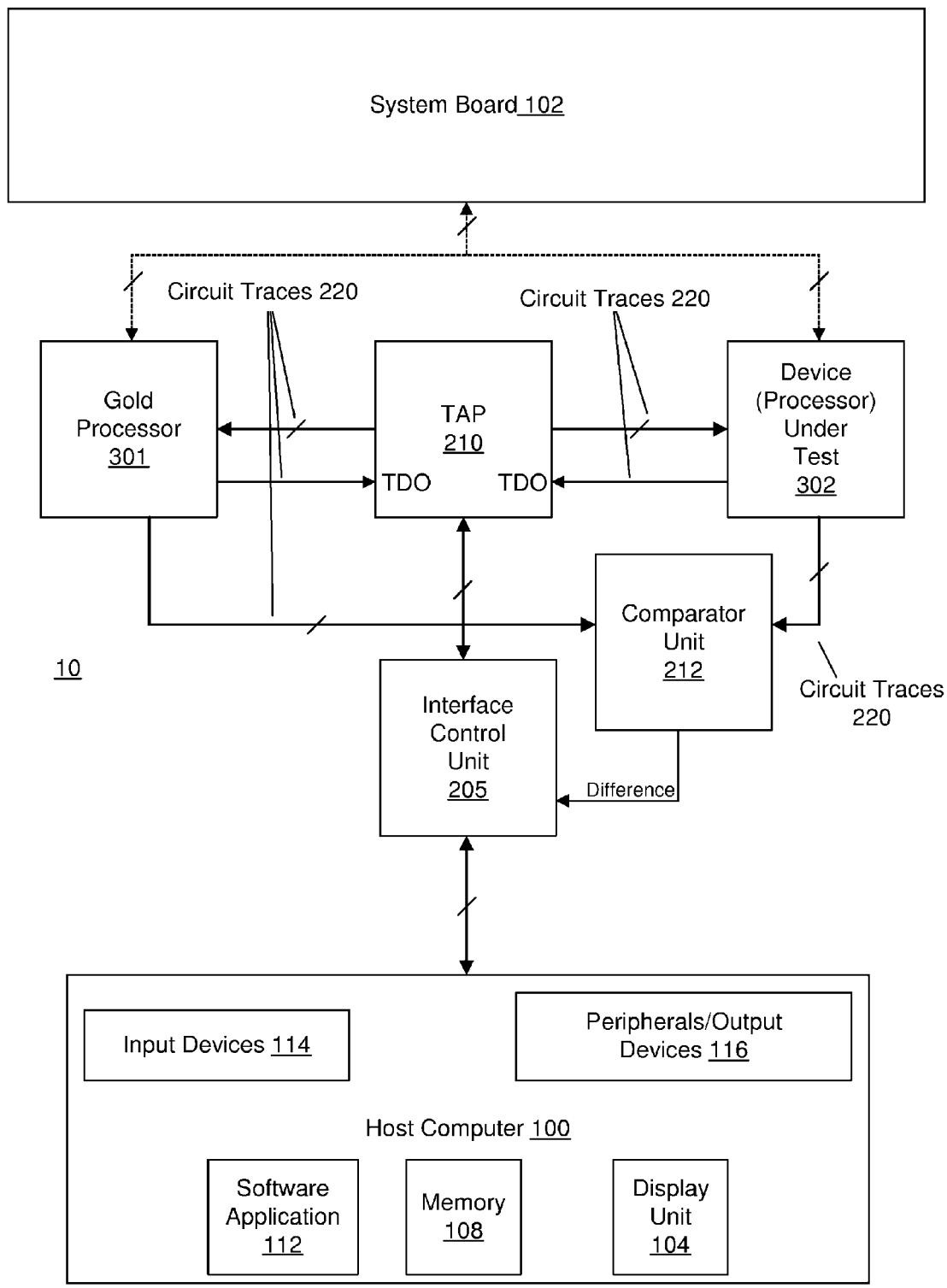
FIG. 2 is a block diagram of one embodiment of a test system.

FIG. 2 is a generalized block diagram of the test system. As with the embodiment shown in FIG. 1A, test system 10 as shown in FIG. 2 includes a gold processor 301, at least one TAP 211, and interface control unit 205, a system test board 102 and a host computer 100, and is configured to test DUT 302. The flow of command communications from host computer 100 to gold processor 301 and DUT 302 is from host computer 100, to interface control unit 205, to TAP 211, and then to the processors.

The flow of data and commands between Gold 301, DUT 302 and System board 102 is controlled by HT Buffer 213. Although the embodiment shown in FIG. 1A includes communications through HyperTransport™ buffers, other embodiments that do not incorporate such a communications architecture are possible and contemplated.

Test output data may be conveyed from gold processor 301 and DUT 302 back to host computer in various ways, depending on the particular embodiment. TAP 211 includes two separate test data output (TDO) connections that are each coupled to receive test data from the corresponding processor to which they are coupled. Test output data received through the TDO connections may be conveyed to host computer 100 through interface control unit 205 in one embodiment, or alternatively, from TAP 211 without the intermediate transfer to (or through) interface control unit 205, as indicated by the dashed line coupling TAP 211 to host computer 100.

Also included in the embodiment shown is comparator unit 212, which is coupled to receive signals from gold processor 301 and DUT 302. In general, comparator unit 212 may be coupled to output pins of the processors, as well as I/O pins of the processors. The logic states present on these pins may be conveyed to comparator unit 212, which is configured to compare the states present on the pins of gold processor 301 to those present on the corresponding pins of DUT 302. If any differences in the states of these pins are detected (which indicates that the processors are no longer operating in synchronous functional lockstep), comparator unit 212 responds by providing a difference indication to interface control unit 205. Responsive to receiving the indication, interface control unit 205 may halt the test. Thereafter, the states of both processors may be output to host computer 100.

Control of the testing by host computer 100 is accomplished by executing a software application 112 running on a CPU (e.g., such as CPU 110 of the embodiment shown in FIG. 1). Software application 112 may generate instructions that are provided to interface control unit 205 (in the form of signals) that instruct the interface control unit 205 on how to control the one or more TAPs 211 present. Responsive thereto, interface control unit 205 drives signals to each of the one or more TAPs 211 instructing it at appropriate times to drive test signals to gold processor 301 and DUT 302. The signals driven to the processors may be in the form of data or commands. For example, interface control unit 205 may direct TAP 211 to input commands into both the gold processor 301 and DUT 302 and then monitor the response to those commands through the TDO inputs (in addition to the comparison functions performed by comparator unit 212). Thus, instead of the generation and storage of large numbers of lengthy test vectors, software application 112 may operate as to cause test signals to be generated and driven to the processors as needed. Software application 112 may also control the conveyance of test output data from the processors to host computer 100. As will be discussed in further detail below, software application 112 may also enable the organization of test output data in various ways, the comparison of test output data, and the outputting of test output data (e.g., to a display unit or by printer).

As previously noted, system board 102 is a computer system motherboard that operates using as its CPU the operating pair of gold processor 301 and DUT 302 (assuming they are both operating in synchronous functional lockstep). When the processors are operating in lockstep, system board 102 operates a single CPU. Gold processor 301 and DUT 302 are both coupled (as indicated by the dashed lines) to system board 102 in order to conduct any necessary communications during testing.

Figure 3:
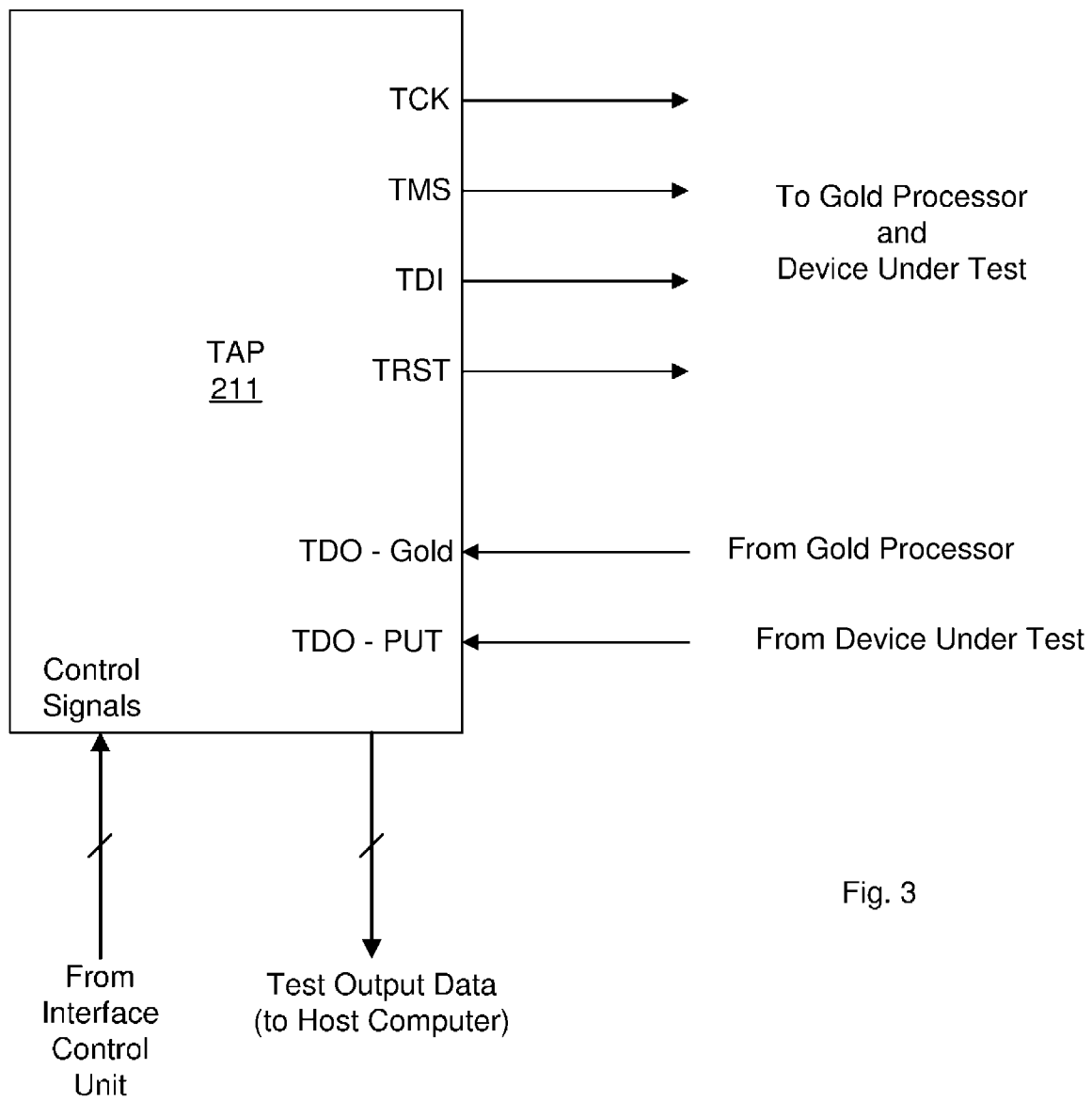
FIG. 3 is a block diagram of one embodiment of a test access port (TAP)

Turning now to FIG. 3, one embodiment of a TAP 211 is shown. In the embodiment shown, TAP 211 conforms to the IEEE 1149.1 specification (i.e. the JTAG [Joint Test Action Group] boundary scan specification). Other embodiments that do not conform to the IEEE 1149.1 specification (or only partly conform) are also possible and contemplated.

TAP 211 includes a plurality of test signal outputs, including a test clock (TCK) output, a test mode select (TMS)

output, a test reset (TRST) output, and a test data in (TDI) output. Although not explicitly shown here, embodiments of TAP 211 having other outputs are possible and contemplated. Broadly speaking, embodiments of TAP 211 may include as many test outputs as necessary to drive signals to the various input (or I/O) pins of gold processor 301 and DUT 302 in accordance with the desired test routines.

The IEEE 1149.1 standard allows a high degree of flexibility in the manner in which a TAP of that standard may be used, such as the implementation of user-specified instructions. In the embodiment shown here, TAP 211 may be used for a wide variety of purposes. For example, instructions may be specified to cause the reading of a given portion of memory (e.g., cache memory in the processor). Execution of such an instruction may include inputting a command to both gold processor 301 and DUT 302 through the TDI connections, reading the cache memory (or specified address therein), and outputting the data to TAP 211 from gold processor 301 and DUT 302 through their respective TDO connections. This output data may then be compared to ensure that it matches, or analyzed if there is a difference. In general, TAP 211 may be used to input a wide variety of data and commands into the processors to which it is coupled and may read out response data through the TDO connections. For these reasons, TAP 211 may be particularly useful during a post-test analysis phase in addition to its use during normal testing.

When TAP 211 is implemented in test system 10 discussed above, each of the test signal outputs is coupled to both a gold processor 301 and DUT 302 by signal paths that are virtually equal in length (e.g., within $\frac{1}{1000}$ of an inch). This allows TAP 211 to simultaneously drive test signals to both of the processors, which may enable the processors to operate in synchronous functional lockstep (provided the gold and DUT processors are functioning identically).

Whereas a typical prior art TAP includes only a single test data output (TDO) connection, TAP 211 includes a pair of TDO connections. One TDO connection may be coupled to gold processor 301, while the other TDO connection is coupled to DUT 302. Thus, unlike the test signal outputs discussed above, the TDO connections are not shared between both the gold processor 301 and DUT 302. This enables the accessing of test output data from DUT 302 independently of gold processor 301, and vice versa. Test output data may be accessed from each of gold processor 301 and DUT 302 concurrently or at different times, depending on the design of the specific test. In some embodiments, it may be critical to access test output data under the same limitations (i.e. substantially simultaneously) that test signals are provided to both processors. In such embodiments, the signals paths from the processors to the TDO connections of the TAP for gold processor 301 may be virtually equal to their counterparts for DUT 302. Test output data may be conveyed from TAP 211 to host computer 100 through one or more signal paths coupled between them.

Additional inputs for receiving test output data from gold processor 301 and DUT 302 may also be present in some embodiments. As with the TDO connections discussed herein, the additional inputs may be provided as dedicated to the gold processor 301 with corresponding additional inputs provided that are dedicated to DUT 302. Furthermore, the signal paths between the additional inputs and gold processor 301 and the corresponding ones coupling to DUT 302 may be of virtually the same length if necessary to receive test output data in a substantially simultaneous manner.

TAP 211 is coupled to receive control signal from interface control unit 205. The control signals received from interface control unit 205 cause TAP 211 to drive signals from one or more of the various outputs to both gold processor 301 and DUT 302. For example, control signals received from interface control unit 205 may cause a test clock signal to be driven from the TCK output while test input data signals are driven from the TDI output. Test signals may be driven to the processors from any additional outputs that may be present as well.

Figure 4:
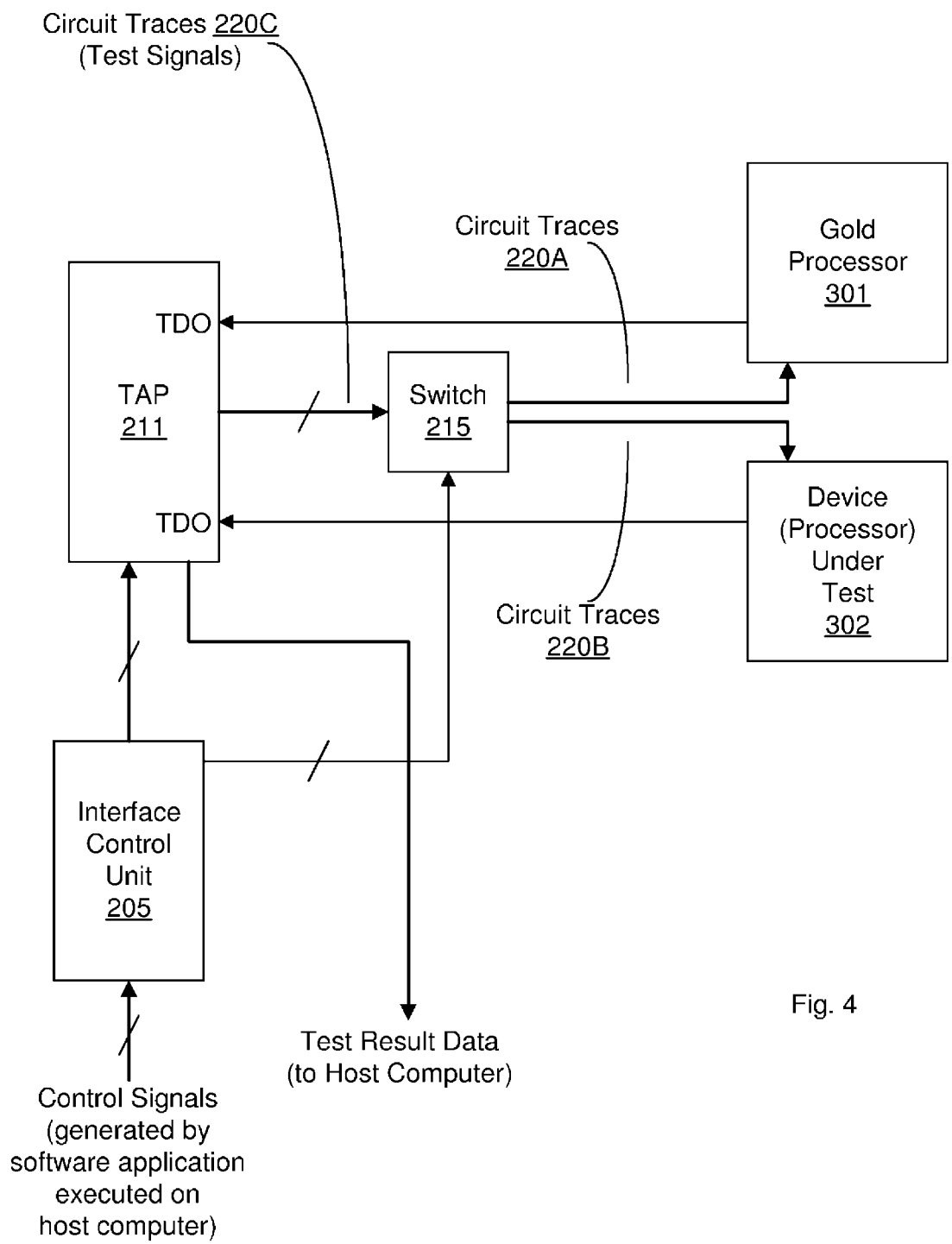
FIG. 4 is a block diagram illustrating the coupling of a TAP to a gold processor and a processor that is a device under test (DUT) for one embodiment of the test system.

FIG. 4 is a block diagram illustrating the coupling of a TAP to the gold processor and a processor under test (DUT) for one embodiment of the test system. In this particular embodiment, a switch 215 is coupled between TAP 211 and each of gold processor 301 and DUT 302. Circuit traces 220C are coupled between TAP 211 and switch 215. During testing, signal traces 220C convey test signals to switch 215. Circuit traces 220A are coupled between switch 215 and gold processor 301, while circuit traces 220B are coupled between switch 215 and DUT 302. Each one of circuit traces 220A and its counterpart among circuit traces 220B are substantially equal in length. Thus, each signal path from TAP 211 to gold processor 301 and its counterpart signal path between TAP 211 and DUT 302 are substantially the same length in order to allow test signals to be simultaneously received by both of the processors.

Switch 215 is a three-position switch and is controllable by interface control unit 205. Through control of switch 215 and TAP 211, interface control unit can effect operation in one of a first mode, a second mode, or a third mode. In the first mode, test signals are driven from TAP 211 to both gold processor 301 and DUT 302. Operation in the first mode is intended to cause gold processor 301 and DUT 302 to operate in synchronous function lockstep, at least until a point that an internal state difference is detected in DUT 302 (assuming any are present).

The second and third modes may be used to drive test signals to either gold processor 301 or DUT 302, respectively and exclusively of one another. These modes may be useful in various situations. For example, the use of the second and third modes can be utilized for comparative analysis between operation of gold processor 301 and DUT 302. In this situation, a series of commands can be input from TAP 211 exclusively into gold processor 301 while operating in the second mode, with responses to those commands read out through its respective TDO connection and subsequently stored (e.g., in memory 108 of host computer 100). Following this, operation can be switched to the third mode, with any series of commands input into DUT 302 without disturbing the internal state of gold processor 301 and the responses thereto being captured through its respective TDO connection and subsequently stored. The data from these exclusive responses can then be organized by the application software on the host system, and displayed to the user of the test system to determine the extent of any internal state differences. Based on the analysis, additional sequences of operation may be initiated to generate additional response data for further analysis, where these additional sequences include operations in the second and third modes.

It should be noted that when switch 215 is set such that TAP 211 drives signals exclusively to the gold processor 301, DUT 302 is driven to a deterministic inactive state. Likewise, when switch 215 is set such that TAP 211 drives signals exclusively to DUT 302, gold processor 301 may is driven to a deterministic inactive state.

Interface control unit 205 is configured to receive control signals from the host computer, which then translates these control signals into signals that are provided to TAP 201. The control signals provided to interface control unit 205 are generated by the software application that is executed on the host computer. For example, the software application may indicate the need to read a certain area of cache memory within one or both processors, depending on the mode of operation. In response, interface control unit 205 may generate signals that are provided to TAP 211 which cause the inputting of read commands into the designated processor(s) and the reading out of the specified cache data through one or both of the TDO connections (again, depending on the mode of operation).

Figure 5:
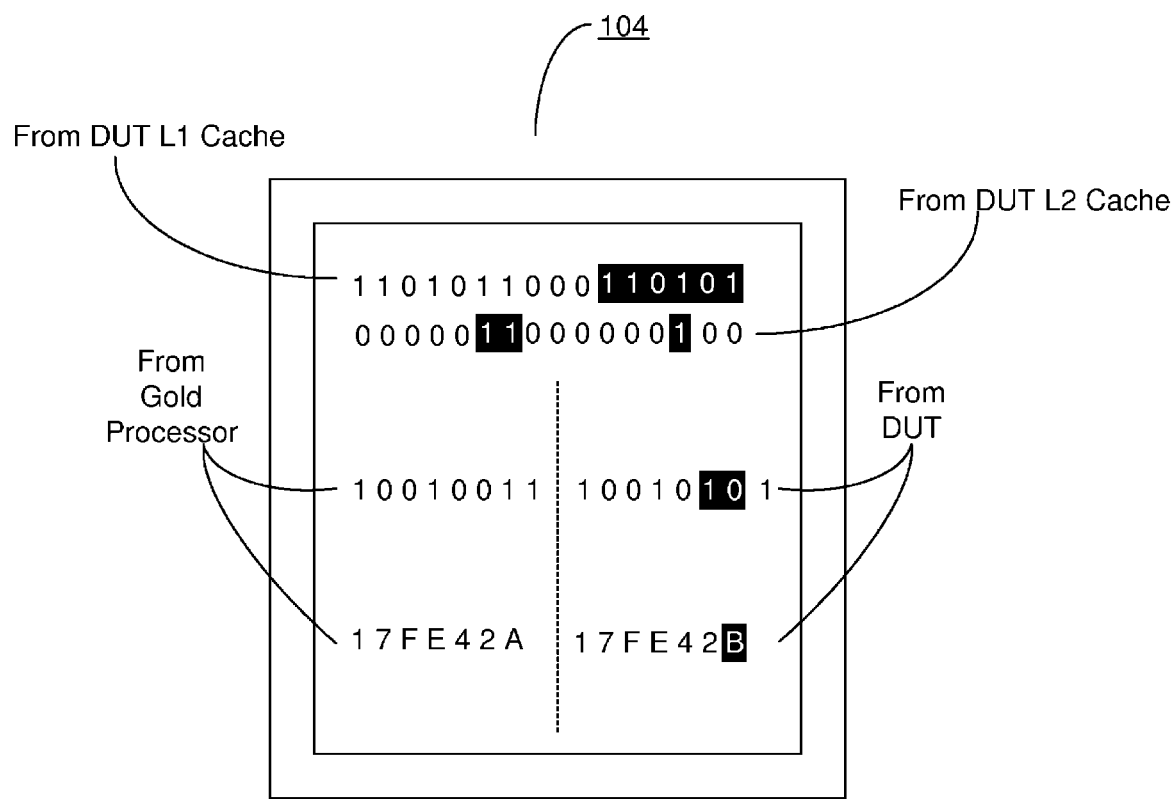
FIG. 5 is a drawing of one embodiment of a display unit illustrating the displaying of test data.

FIG. 5 is a drawing of one embodiment of a display unit illustrating the displaying of test result data and comparisons thereof. It should be noted that FIG. 5 is exemplary, and a wide variety of methods of displaying test result data and comparisons thereof are possible and contemplated. In the embodiment shown, display unit 104 is displaying data, in binary form, for a portion of a L1 cache and a L2 cache. As is shown in the drawing, the image displayed of some data appears inverse (i.e., white numerals on a black background instead of black numerals on a white background). In this example, the inversely displayed images of data represents instances wherein the test result data obtained from DUT 302 differs from that of gold processor 301. These differences are detected by comparisons of the test result data obtained from each of gold processor 301 and DUT 302, under direction of the software application executing on the host computer.

The inverse display of differences in test result data is but one possibility contemplated. In general, data may be displayed in a wide variety of colors, in accordance with the design of the test and/or user input. For example, when test result data from DUT 302 matches that obtained from gold processor 301, it may be displayed in green on display unit 104, while data that does not match is displayed in red.

In the cache examples discussed above, data is displayed only for DUT 302, with the differences between gold processor 301 and DUT 302 being highlighted by an inverse display of data. As is also shown in FIG. 5, data can be displayed for both gold processor 301 and DUT 302. In these examples, differences in the data between the two processors are highlighted by displaying the non-matching data from DUT 302 in a different color than its equivalent from gold processor 301. Furthermore, data can be displayed as binary data as shown in one instance or as hexadecimal data as shown in another. Other formats for displaying data (e.g., numeric) are also possible and contemplated.

In general, the displaying of test result data may be accomplished in a number of different formats. Test result data may be organized and displayed to users by source processor (i.e. gold or DUT), by the particular test conducted, by internal units of the DUT being subject to the test (e.g., a cache), and so forth. The specific type, amount, and format of the data to be displayed may be determined based on user inputs. The software application and its various sub-applications allow a user of the test system a high degree of flexibility in determining the specifics regarding the display of data in order to facilitate the ability to organize, interpret, and analyze test results. Test result data displayed may be used by those skilled users of test system to determine the extent of internal state differences. The analysis of internal state differences may be used to pinpoint a location in DUT 302 where data is being produced that does not match that of gold processor 301, thereby allowing the isolation of suboptimal circuit behavior. In various embodiments, additional information may be displayed, such as a memory/cache addresses, status and control logic, program registers, and so on, where differences are occurring.

Comparisons of test result data from gold processor 301 and DUT 302 may also be shown by displaying the test result data in various colors. Test result data may be displayed in various formats, such as binary or hexadecimal, among others. As previously mentioned, the particulars of the data displayed and its format may be determined based on input from a user of the test system. The comparing (to determine differences between data obtained from gold processor 301 and DUT 302) of test result data, as well as its organizing, formatting, and outputting may all be accomplished under control of the software application executing on host computer system 100. It should also be noted that in some embodiments, hard copies of the test result data may be printed in the same form as which they are displayed on display unit 104.

Figure 6A:
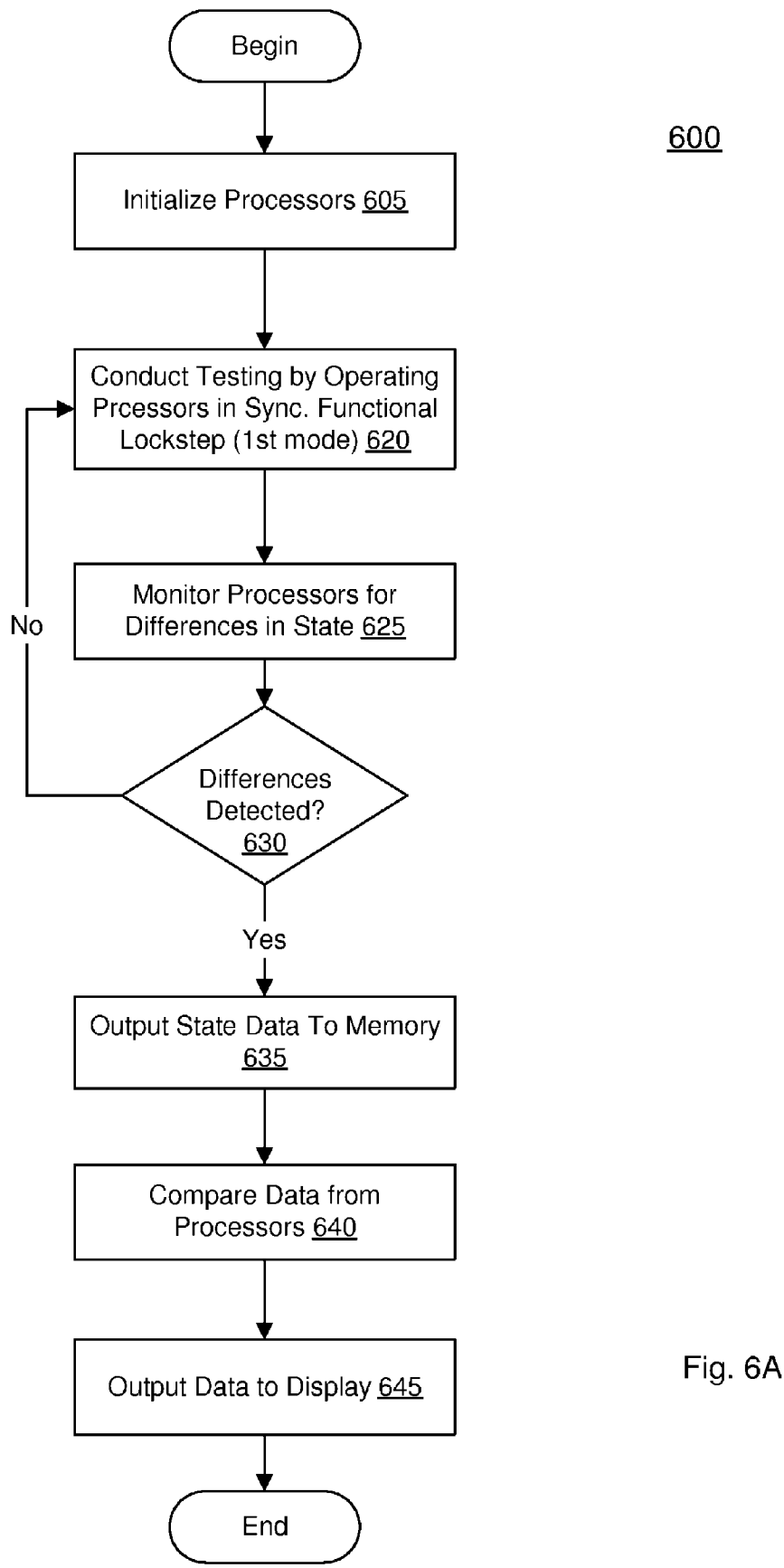
FIG. 6A is a flow diagram of one embodiment of a method for testing a processor.

Turning now to FIG. 6A, a flow diagram of one embodiment of a method for testing a processor is illustrated. In the embodiment shown, method 600 begins with the initialization of a gold processor and a DUT (605), wherein the DUT is a processor of the same type and revision level as the gold processor. Once synchronization is achieved, the test system may begin to conduct testing by operating the gold processor and DUT in synchronous functional lockstep (620).

During testing, the internal state of both the gold processor and the DUT are monitored to ensure that their internal states are the same at each clock cycle and are thus, in functional lockstep (625). The monitoring may be done in such a manner as to not disturb the internal state of the processors. The monitoring includes ongoing comparisons of the state of the gold processor and the state of the DUT, and may be accomplished by various means (e.g., monitoring various output pins of the processors). If no differences are detected (630, no), which indicates that the processors are operating in lockstep, testing continues (620).

If differences between the states of the gold processor and the DUT are detected (630, yes), then testing may be halted. State data is then output from both the gold processor and the DUT and stored in a host computer memory (635) by the software application executing thereon. The software application then compares the data from the gold processor with that of the DUT (640), organizes and formats the data and results of the comparisons, and presents the results to the user video display (645). Hardcopies of data may also be output to a printer if desired.

Figure 6B:
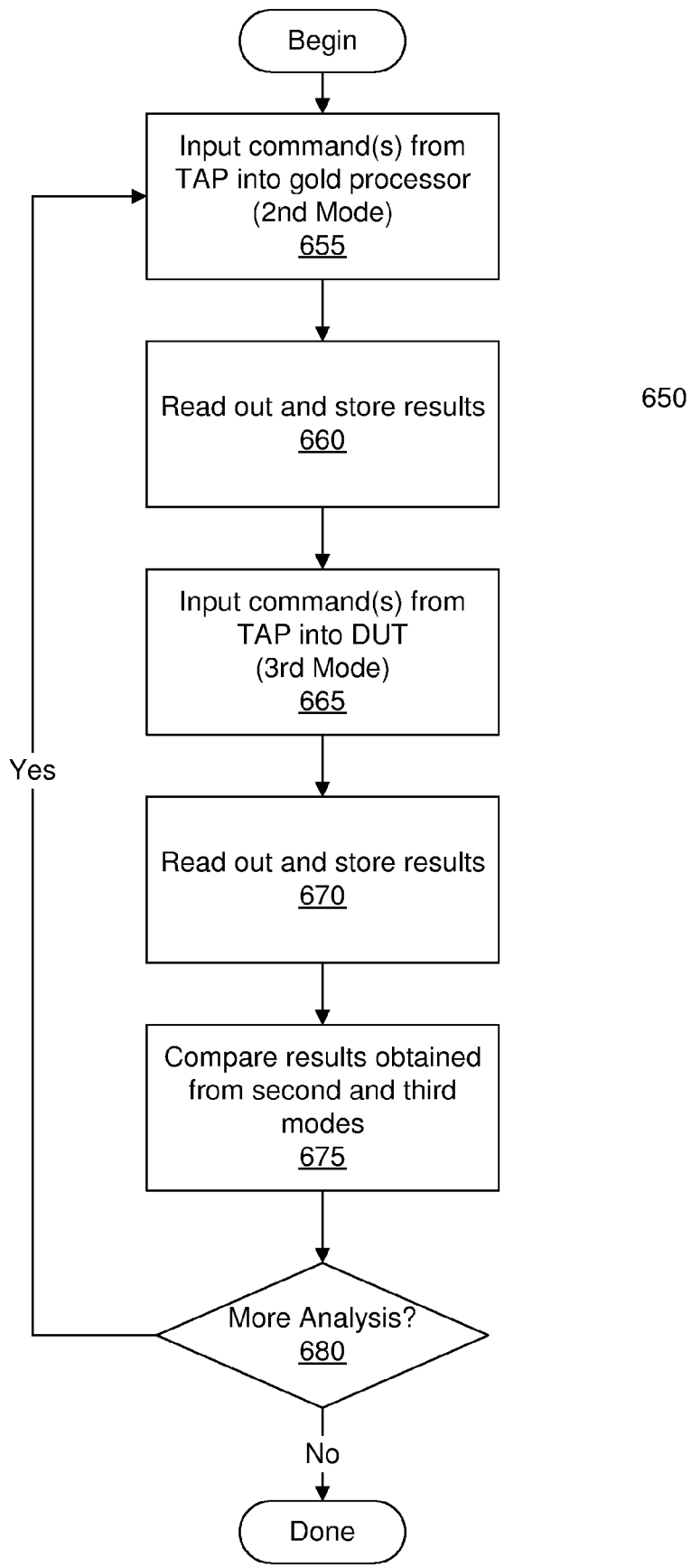
FIG. 6B is a flow diagram of one embodiment of a method of operating the test system in the second and third modes.

It should be noted that the embodiments presented in FIGS. 6A and 6B are exemplary, and that a wide variety of different methods for testing a processor are possible and contemplated. As has been previously noted, the software application executed on the host computer, and its various sub-applications, allow a user a high degree of configurability in determining the specifics of the test. A user may specify data and/or commands that are to be input into the gold processor and/or the DUT during testing. Additionally, the user may specify data that is to be obtained from the gold processor and/or the DUT during testing, which data should be compared, which data should be displayed, and how the data should be displayed. A user may also specify other particulars of the testing process, such as breakpoints where a test is halted or paused. In contrast to the specific example discussed in reference to FIG. 6A, a user may specify that testing continue even after a difference is detected between the states of the gold processor and the DUT. In general, the software application and its various sub-applications may allow a user to determine the specifics of what is tested, how it is tested, what data is gathered from testing, and how that data is stored, compared, analyzed, and displayed.

Turning now to FIG. 6B, a flow diagram of one embodiment of a method wherein data may be gathered for analysis by operation in the second and third modes of operation (wherein operation in the first mode involves the simultaneous driving of test signals to both the gold processor and the DUT) is shown. This method is exemplary, and is but one embodiment of a wide variety of methods that may be utilized to gather data for analysis by operating in the second and third modes.

Method 650 begins with operation in the second mode by inputting of one or more commands from a TAP exclusively into the gold processor (655). After inputting the one or more commands from the TAP, responses may be read out of the gold processor (660) and stored in a memory. It should be noted that the reading out and storing of responses may begin before all commands have been input in situations involving a series of commands.

As previously noted above, the DUT is driven to a deterministic inactive state when driving signals from the TAP exclusively to the gold processor in the second mode. Similarly, in the third mode discussed below, the gold processor is driven to a deterministic inactive state when driving signals from the TAP exclusively to the DUT.

Operation may then shift to the third mode by inputting commands from the TAP exclusively into the DUT (665). Results that are responses to the commands may then be read out and stored (670) in the same manner as they were in the second mode. The results obtained in the second mode may then be compared with those obtained in the third mode (675), and analysis may follow. Since the comparison of results may be give rise to the need or desire for more analysis (680, yes), the method may return to operation in the second mode. Otherwise this embodiment of the method completes (680, no).

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A system for testing a processor, the system comprising:
    a gold processor;
    a test access port (TAP) coupled to the gold processor and a processor that is a device under test (DUT), wherein the TAP is coupled to simultaneously provide a plurality test signals to both the gold processor and the DUT such that, during testing, the gold processor and the DUT operate in synchronous functional lockstep with respect to each other, wherein the TAP includes a first test data out (TDO) connection and a second TDO connection, wherein the first TDO connection is coupled to access test output data from the gold processor, and wherein the second TDO connection is coupled to access test output data from the DUT; and
    an interface control unit coupled to the TAP, wherein the interface control unit is configured to cause the TAP to drive signals to both the gold processor and the DUT, and further configured to cause the TAP to access test output data from the gold processor and the DUT independently of one another.

2. The system as recited in claim 1, wherein the TAP includes a plurality of test signal outputs each corresponding to one of the plurality of test signals, wherein each of the plurality of test signal outputs are shared by the gold processor and the DUT.

3. The system as recited in claim 2, wherein the plurality of test signal outputs is coupled to provide the plurality of test signals to the gold processor over a first plurality of signal paths, and wherein the plurality of test signal outputs is coupled to provide the plurality of test signals to the DUT over a second plurality of signal paths.

4. The system as recited in claim 3, wherein for a given one of the plurality of test signal outputs, a corresponding one of the first plurality of signal paths has a length substantially the same as a corresponding one of the second plurality of signal paths.

5. The system as recited in claim 4, wherein the length of the corresponding one of the first plurality signal paths is within 1/1000 of an inch of a length of the corresponding one of the second plurality of signal paths.

6. The system as recited in claim 3, wherein the system includes a comparator board having the first and second plurality of signal paths, wherein the TAP is mounted on the comparator board and wherein the comparator board further includes a first processor socket configured to receive the gold processor and a second processor socket configured to receive the DUT.

7. The system as recited in claim 6, wherein the system includes an interposer board and a system board, wherein the interposer board is coupled to the comparator board and further configured to be coupled to a third processor socket mounted on the system board.

8. The system as recited in claim 7, wherein the system board is configured to drive signals to the interface control unit to cause the TAP to provide test signals to the gold processor and the DUT, and wherein the system board is further coupled to receive test output data from the TAP via the interposer board.

9. The system as recited in claim 8, wherein the system includes a host computer having a display unit, and wherein the host computer is configured to output test results to the display unit.

10. The system as recited in claim 2, wherein the test signal outputs comprise outputs for:
    a test clock signal;
    a test mode select signal;
    test data; and
    a test reset signal.

11. The system as recited in claim 1, wherein the TAP is an IEEE 1149.1 test access port.

12. A method for testing a processor, the method comprising:
    driving test signals from the TAP to a gold processor and a processor that is a under test (DUT), wherein the TAP is coupled to simultaneously provide a plurality test signals to both the gold processor and the DUT such that, during testing, the gold processor and the DUT operate in synchronous functional lockstep with respect to each other;
    controlling the TAP with an interface control unit, wherein the interface control unit is configured to cause the TAP to perform said driving;
    receiving test output data from the gold processor, wherein the test output data from the gold processor is received by the TAP through a first test data out (TDO) connection;
    receiving test output data from the DUT, wherein the test output data from the DUT is receive by the TAP through a second TDO connection;
    displaying test output data from the gold processor and test output data from the DUT; and
    determining results of said testing.

13. The method as recited in claim 12 further comprising the TAP outputting test signals to the gold processor and the DUT from a plurality of shared test signal outputs.

14. The method as recited in claim 13, wherein the plurality of test signal outputs is coupled to provide the plurality of test signals to the gold processor over a first plurality of signal paths, and wherein the plurality of test signal outputs is coupled to provide the plurality of test signals to the DUT over a second plurality of signal paths.

15. The method as recited in claim 14, wherein for a given one of the plurality of test signal outputs, a corresponding one of the first plurality of signal paths has a length substantially the same as a corresponding one of the second plurality of signal paths.

16. The method as recited in claim 14 further comprising test signals output by the TAP arriving at the gold processor and the DUT in the same clock cycle.

17. The method as recited in claim 12 further comprising accessing the test output data from the gold processor and the test output data of the DUT independently from one another.

18. The method as recited in claim 16 further comprising outputting the test output data from the gold processor and the test output data of the DUT to a display unit.

19. The method as recited in claim 17 further comprising comparing the test output data from the gold processor and the test output data of the DUT.

\* \* \* \* \*